June 22, 1937.  F. R. CANNEY  2,084,790

CABIN AND WINDOW STRUCTURE

Filed Dec. 16, 1936  2 Sheets—Sheet 1

Inventor
Frank R. Canney
By Charles L. Reynolds
Attorney

June 22, 1937.  F. R. CANNEY  2,084,790
CABIN AND WINDOW STRUCTURE
Filed Dec. 16, 1936   2 Sheets-Sheet 2
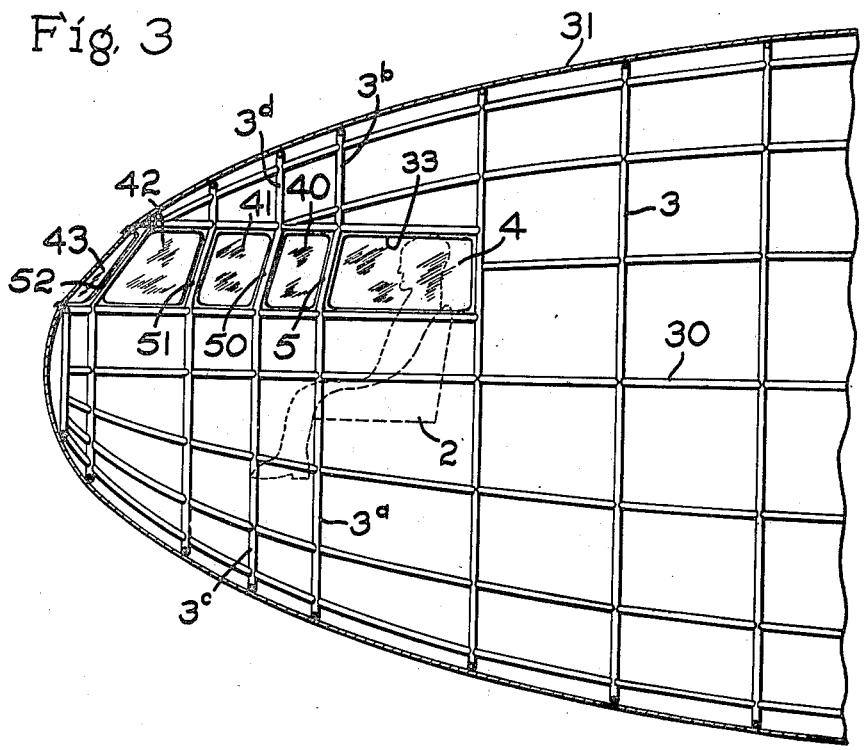
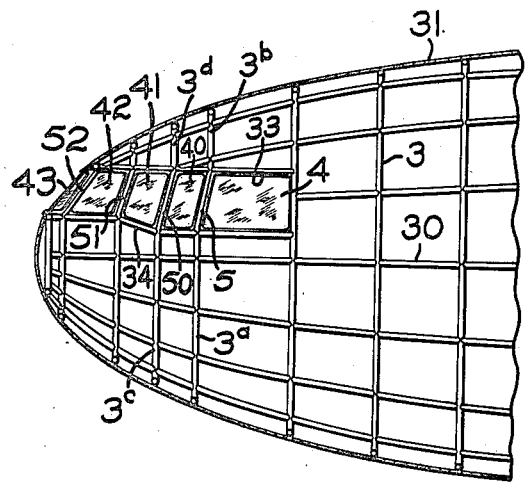
Inventor
Frank R. Canney
By Charles L. Reynolds
Attorney Patented June 22, 1937

2,084,790

UNITED STATES PATENT OFFICE 2,084,790

CABIN AND WINDOW STRUCTURE

Frank R. Canney, Seattle, Wash., assignor to Boeing Aircraft Company, Seattle, Wash., a corporation of Washington Application December 16, 1936, Serial No. 116,158

5 Claims. (Cl. 244—119)

This invention pertains to airplanes or other aircraft structures, and more especially to a cabin construction intended for high altitude airplanes.

In such airplanes it is essential to supply air within the cabin at pressures considerably exceeding such low external pressures as prevail at high altitudes, so that passengers will not be affected by diminution of pressure or lack of sufficient oxygen. As a result there is a tendency for the higher internal pressure to bulge outward or expand the cabin structure. The structure can, of course, be built sufficiently strong to withstand this internal pressure, especially since the cabin of such airplanes will commonly be of circular or approximately circular cross section, and generally with a rounded or ogival nose shape. However, the structure must necessarily be as light as possible consistent with the strength desired.

Were it possible to build such a structure without apertures the structure could indeed be very light, but it is necessary to provide windows, doors, access openings and other apertures, some of them of considerable area or vertical or longitudinal extent, and this necessitates strengthening the structure which is weakened by such openings. Particularly are such windows required, in a band across the nose of the pilot's cockpit, so that the pilot may have adequate vision ahead and to both sides. This in effect leaves a slot in the structure of the cabin, usually parallel to but offset from an axial plane, and the structure of the cabin is thereby very appreciably weakened. It is necessary to join the opposite sides of any such aperture with structural members, for of course the glass cannot be employed for structural strength, yet at the same time the minimum of material must be employed, for lightness and visibility, and any members spanning such an aperture must be so placed as to assure to the pilot the least impeded vision.

It is a particular object of the present invention to provide a structure for aircraft of the general type indicated, which will afford proper visibility and permit of the leaving of suitable apertures in the structure, which will properly connect opposite sides of these apertures, and which will connect them with members of the lightest weight and smallest extent possible to carry the stresses developed, by so locating such spanning members that they are substantially solely in tension and so located as to produce, under the stresses developed by the internal pressure, a minimum of stresses in the main structure.

My invention, therefore, comprises the novel structure, and the novel combination and arrangement of the parts thereof, as shown in the accompanying drawings, as described in this specification, and as will be more particularly pointed out by the claims which terminate the same.

In the accompanying drawings I have shown my invention illustrated in conjunction with a typical airplane, and in conjunction with typical structures thereof, it being understood, however, that the principles of the invention are applicable to various types of aircraft and to various types of cabin construction, and my invention is not to be limited only to the structure herein shown, other than as may be required by the claims.

Figure 3 is an axial sectional view through a typical cabin construction, showing the nose portion thereof, and Figure 4 is a similar view showing a slightly modified arrangement of the windows.

Figure 1:
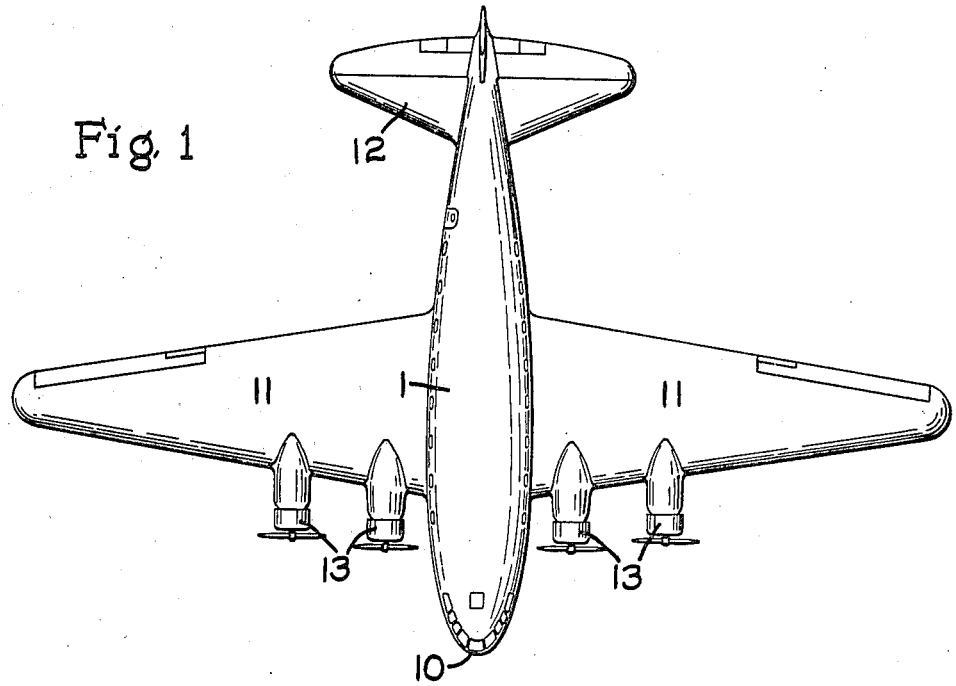
Figure 1 is a plan view of such a typical airplane.
Figure 2:
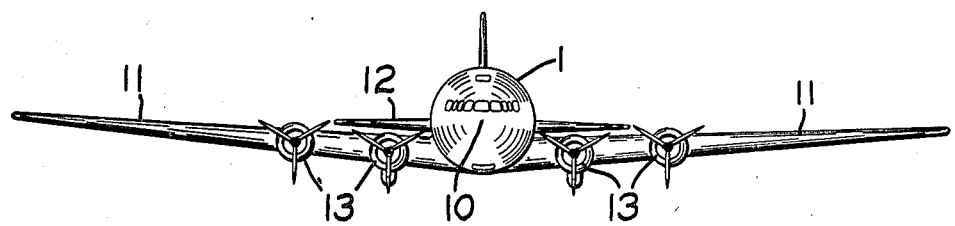
Figure 2 is a front elevation of the same.

The cabin 1 of such an airplane would normally be of tear-drop shape, circular in cross section, or substantially so, with an ogival nose, indicated at 10, and a tapering tail. It is sustained in flight by the usual wings 11 and tail surfaces 12, and is powered with outboard motors 13. This leaves the entire nose portion of the cabin free for good vision of the pilot, whose seat would be located approximately as shown at 2 in Figure 3, from which position the pilot can observe to either side of the airplane and ahead through windows positioned as shown in Figure 3. These windows are so located and shaped as to maintain the curvature and shape of the cabin, as described above.

The structure of the fuselage or cabin may vary widely, and may be any which proper practice dictates, but for lightness, coupled with maximum strength, a monocoque construction, as shown in Figures 3 and 4, may be employed. In this construction connected structural members, such as the circumferential members 3 and the longitudinal members 30, are secured together in a form which defines the approximately ogival shape of the nose, and to this framework is secured a skin 31. The circumferential members 3 are at all stations substantially circles defining planes normal to the axis of the cabin, and the longitudinal members 30 are disposed in axial planes so that they converge at or near the extreme tip or nose of the cabin.

For proper vision of the pilot it becomes necessary to interrupt this structure and the skin to provide the windows 4, 40, 41, 42 and 43, these being placed in a band which includes both sides of the extreme nose portion of the cabin from the tip backward along each side. The windows must be comparatively short in extent, so that the general curvature of the skin may be unbroken, and since it is not practicable to shape them to the curvature required, especially when the windows are offset from the axis of the fuselage; that is to say, when the opening designated 33 for the reception of these windows defines a plane parallel to but offset from the axis of the cabin.

Because of the extent of this opening or slot 33 it is necessary to connect its opposite sides by structural members, and in order that the pilot may have his vision obscured the least by such structural members or struts, and in order that these struts may transmit substantially no stresses except tension, they are disposed generally in lines or arcs which constitute part of a geodesic through the particular part of the surface wherein they are placed. In other words, each strut lying in the surface of the cabin is placed along the line which is the shortest distance between the two points which it is to connect, and preferably the two points thus connected should lie in circles of the interrupted circumferential structural members 3. Thus, as seen in Figure 3, the strut 5 connects a part-circumferential member 3ª and a second part-circular member 3ᵇ, the plane of which is slightly offset from the plane of the member 3ª. The strut 50 is not parallel to the strut 5, since it lies in a different great circle, and connects the part-circular structural member 3ᶜ and the part-circular structural member 3ᵈ, whose planes are offset slightly from each other. Similar struts 51 and 52 are employed, to the extent required to adequately connect the opposite edges of the slot 33, and to the extent necessary to frame the several windows, but each one is part of a great circle through its particular part of the surface of the skin.

As a result the internal pressure, acting outwardly and tending to separate opposite sides of the slot 33, produces only tension in these struts 5, 50, 51 and 52, and they in turn transmit stresses from a part-circular member such as 3ª to a part-circular member 3ᵇ with but little or no component lengthwise of the structure. In this way the structure is accorded maximum strength with minimum weight, with minimum obscuring of the pilot's vision, and with minimum local stresses acting on the other parts of the structure, and of course without any racking or stresses transmitted to or carried by the window glass.

If it is necessary to increase the depth of some of the windows, as shown in Figure 4, certain of the longitudinal members defining the edge of the slot 33 may be somewhat inclined, as indicated at 34, whereupon any longitudinal component developed in the strut 50, for example, will be translated into tension in the inclined member 34, thereby affording maximum strength with minimum weight, and with the least distortion of adjoining parts.

While the invention has been illustrated and described in conjunction with the pilot's windows, it will be evident that the same principles may be applied to passenger windows, to access openings, and the like.

What I claim as my invention is:

1. In an aircraft structure having a generally rounded cross section and elongated shape with a generally rounded end, structural members disposed to resist expansive stresses developed by internal pressure, and a skin carried by said structural members, said structural members being interrupted over an appreciable area to afford an opening, and tension members extending across such opening and connecting structural members at opposite sides thereof, and disposed substantially along geodesic lines, to transmit such stresses most directly and substantially entirely in tension.

2. In an aircraft structure of ogival shape, connected structural members extending generally circumferentially and generally longitudinally, respectively, and a skin carried by said structural members, said skin and structural members being interrupted to provide a window opening, and tension members extending across such opening, and connected to structural members at opposite sides thereof, and disposed substantially along geodesic lines, to transmit expansive stresses, developed by internal pressures, from edge to edge of the opening substantially entirely as tension.

3. In an aircraft for use at high altitudes, a cabin having a nose of generally ogival shape, the structure of which has a slot therein extending generally parallel to the axis of the ogive, to afford a window opening, a plurality of windows disposed in such opening, in a continuous band, and struts disposed between adjoining windows connecting the upper and lower edges of the window opening, and extending in a direction to transmit tension between such edges with a minimum deviation from geodesic lines.

4. In an aircraft for use at high altitudes, a closed cabin having a nose of generally ogival shape, the structure of which has a slot therein extending from the tip of the nose rearward on each side, defining a plane generally parallel to but offset from the axis of the ogive, to afford a window opening, a plurality of windows each extending from top to bottom of the slot, and closely adjoining along the slot to afford good vision and to preserve the ogival shape, part-circular structural members disposed generally circumferentially, and terminating at the slot, and generally upright struts disposed between adjoining windows, between the upper and lower edges of the slot, in a direction to transmit tension from an end of an interrupted structural member to an end of another such member, without substantial deviation from geodesic lines.

5. In an aircraft for use at high altitudes, a cabin of substantially circular cross section and having an ogival nose, said cabin including generally circumferential structural members, longitudinal structural members connecting the same and converging towards the nose, and a skin carried by said structural members, and windows disposed in the skin, in a longitudinally extending band offset from the longitudinal axis of the cabin, intersecting and interrupting a plurality of such structural members, and struts disposed adjacent the skin between adjoining windows, and connecting the interrupted circular structural members for transmission of tension between their ends without substantial deviation from geodesic lines.

FRANK R. CANNEY.